(12) United States Patent
Mader et al.

(10) Patent No.: US 10,581,290 B2
(45) Date of Patent: Mar. 3, 2020

(54) RELUCTANCE ARMATURE

(71) Applicant: SIEMENS AKTIENGESELLSCHAFT, München (DE)

(72) Inventors: Daniel Mader, Bad Neustadt an der Saale (DE); Rolf Vollmer, Gertsfeld (DE)

(73) Assignee: Siemens Aktiengesellschaft, München (DE)

( * ) Notice: Subject to any disclaimer, the term of this patent is extended or adjusted under 35 U.S.C. 154(b) by 230 days.

(21) Appl. No.: 14/858,445

(22) Filed: Sep. 18, 2015

(65) Prior Publication Data

US 2016/0087501 A1 Mar. 24, 2016

(30) Foreign Application Priority Data

Sep. 19, 2014 (EP) .................................... 14185534

(51) Int. Cl.
| | |
|---|---|
| H02K 1/02 | (2006.01) |
| H02K 1/24 | (2006.01) |
| H02K 3/28 | (2006.01) |
| H02K 7/00 | (2006.01) |
| H02K 15/00 | (2006.01) |

(52) U.S. Cl.
CPC .............. *H02K 3/28* (2013.01); *H02K 1/246* (2013.01); *H02K 7/003* (2013.01); *H02K 15/00* (2013.01); *H02K 1/02* (2013.01); *H02K 2201/06* (2013.01)

(58) Field of Classification Search
CPC ............ H02K 1/02; H02K 1/246; H02K 3/28; H02K 7/003; H02K 15/00; H02K 2201/06
USPC .... 310/208, 156.21, 156.36, 156.37, 156.47, 310/156.61; 29/596

IPC ...................... H02K 3/28,7/00, 15/00
See application file for complete search history.

(56) References Cited

U.S. PATENT DOCUMENTS

| | | | | |
|---|---|---|---|---|
| 2,985,779 A | * | 5/1961 | Flaningam ............. | H02K 1/278 310/156.19 |
| 4,642,502 A | * | 2/1987 | Carpenter ............. | H02K 1/278 310/156.12 |
| 4,713,569 A | * | 12/1987 | Schwartz ............... | H02K 21/14 310/152 |

(Continued)

FOREIGN PATENT DOCUMENTS

| | | |
|---|---|---|
| CN | 101080862 A | 11/2007 |
| EP | 2 775 591 A1 | 9/2014 |

(Continued)

OTHER PUBLICATIONS

"Magnetic Materials: Hard Magnets"; Published by University of Birmingham, UK, captured on Sep. 2018 from Google at following web-page. https://www.birmingham.ac.uk/Documents/college-eps/metallurgy/research/Magnetic-Materials-Background/Magnetic-Materials-Background-9-Hard-Magnets.pdf.*

(Continued)

*Primary Examiner* — John K Kim
(74) *Attorney, Agent, or Firm* — Henry M. Feiereisen LLC

(57) ABSTRACT

A reluctance armature includes a shaft received in a shaft hole in a torsion-proof manner. At least one carrier body is disposed around the shaft and has radial sides as viewed in a circumferential direction. Part segments are arranged on the radial sides of the carrier body and made of anisotropic soft-magnetic material to thereby establish an armature segment which, as viewed in an axial direction, is disposed between two edge elements and forms a central section.

16 Claims, 2 Drawing Sheets

(56) References Cited

U.S. PATENT DOCUMENTS

| | | | |
|---|---|---|---|
| 5,010,266 A * | 4/1991 | Uchida | H02K 1/2773 310/156.22 |
| 5,039,897 A * | 8/1991 | Iwamatsu | H02K 1/2773 310/156.18 |
| 5,091,668 A * | 2/1992 | Cuenot | H02K 1/2773 310/156.61 |
| 5,693,250 A | 12/1997 | El-Antably et al. | |
| 5,703,421 A | 12/1997 | Durkin | |
| 5,929,551 A | 7/1999 | El-Antably et al. | |
| 6,426,576 B1 * | 7/2002 | Varenne | H02K 1/2773 310/156.09 |
| 6,483,221 B1 | 11/2002 | Pawellek et al. | |
| 6,765,319 B1 * | 7/2004 | Thompson | H01F 1/0578 310/156.08 |
| 6,906,443 B2 * | 6/2005 | Luo | H02K 1/278 310/156.47 |
| 6,967,420 B2 * | 11/2005 | Laurent | H02K 1/2773 310/156.51 |
| 7,071,592 B1 * | 7/2006 | Lu | H02K 1/278 310/156.25 |
| 9,401,631 B2 * | 7/2016 | Wu | H02K 1/2766 |
| 2006/0219880 A1 | 10/2006 | Braun et al. | |
| 2007/0040466 A1 | 2/2007 | Vollmer | |
| 2007/0114861 A1 | 5/2007 | Bott et al. | |
| 2007/0176512 A1 * | 8/2007 | Fujii | H02K 7/118 310/261.1 |
| 2007/0257566 A1 | 11/2007 | Vollmer | |
| 2007/0257575 A1 | 11/2007 | Vollmer | |
| 2007/0290566 A1 * | 12/2007 | Mizutani | H02K 1/276 310/156.56 |
| 2008/0055032 A1 * | 3/2008 | Miyata | H02K 1/278 335/306 |
| 2008/0169718 A1 | 7/2008 | Bott et al. | |
| 2008/0185931 A1 | 8/2008 | Platen et al. | |
| 2008/0218007 A1 * | 9/2008 | Masuzawa | H01F 1/0578 310/44 |
| 2008/0289440 A1 | 11/2008 | Denk et al. | |
| 2008/0315704 A1 | 12/2008 | Vollmer | |
| 2009/0009114 A1 | 1/2009 | Schunk et al. | |
| 2009/0015080 A1 | 1/2009 | Vollmer et al. | |
| 2009/0152959 A1 | 6/2009 | Vollmer | |
| 2009/0152976 A1 | 6/2009 | Bott et al. | |
| 2009/0160283 A1 | 6/2009 | Bott et al. | |
| 2009/0160388 A1 * | 6/2009 | Zagromski | B23Q 5/58 318/570 |
| 2009/0184602 A1 | 7/2009 | Braun et al. | |
| 2009/0251013 A1 | 10/2009 | Vollmer et al. | |
| 2009/0315424 A1 | 12/2009 | Vollmer | |
| 2010/0000830 A1 | 1/2010 | Budde et al. | |
| 2010/0013333 A1 | 1/2010 | Vollmer | |
| 2010/0133940 A1 | 6/2010 | Grossmann et al. | |
| 2010/0244607 A1 * | 9/2010 | Fujimoto | H02K 1/278 310/156.21 |
| 2010/0264770 A1 | 10/2010 | Braun et al. | |
| 2011/0006617 A1 | 1/2011 | Budde et al. | |
| 2011/0248594 A1 * | 10/2011 | Thomas | H02K 1/278 310/156.46 |
| 2012/0025654 A1 | 2/2012 | Bach et al. | |
| 2012/0036696 A1 * | 2/2012 | Murakami | H01F 7/0221 29/426.2 |
| 2012/0038228 A1 | 2/2012 | Vollmer | |
| 2012/0161551 A1 | 6/2012 | Miyamoto et al. | |
| 2012/0313461 A1 * | 12/2012 | Takeuchi | H02K 1/278 310/43 |
| 2013/0214620 A1 * | 8/2013 | Kobayashi | H02K 1/278 310/43 |
| 2013/0241326 A1 * | 9/2013 | Pal | H02K 1/32 310/54 |
| 2014/0111052 A1 * | 4/2014 | Wu | H02K 1/2766 310/156.28 |
| 2014/0117791 A1 | 5/2014 | Fiseni et al. | |
| 2014/0265705 A1 * | 9/2014 | Tsuchida | H02K 1/2766 310/156.38 |
| 2015/0076950 A1 * | 3/2015 | Asao | H02K 15/03 310/156.38 |
| 2015/0380995 A1 * | 12/2015 | Mochida | H02K 1/2766 310/156.53 |
| 2016/0087501 A1 * | 3/2016 | Mader | H02K 3/28 310/208 |
| 2016/0329786 A1 * | 11/2016 | Wu | H02K 1/2766 |

FOREIGN PATENT DOCUMENTS

| | | |
|---|---|---|
| GB | 25 06 683 A | 4/2014 |
| JP | 2004088852 A | 3/2004 |
| WO | WO 2011-032201 A1 | 3/2011 |

OTHER PUBLICATIONS

"Magnetic Materials: Soft Magnets", Published by University of Birmingham, UK, captured on Sep. 2018 from Google at following web-page. . https://www.birmingham.ac.uk/Documents/college-eps/metallurgy/research/Magnetic-Materials-Background/Magnetic-Materials-Background-10-Soft-Magnets.pdf.*

Deng et al, "Isotropic and anisotropic nanocrystalline NdFeB bulk magnets prepared by binder-free high-velocity compaction technique", Journal of Magnetism and Magnetic Materials, vol. 390, Sep. 15, 2015, pp. 26-30.*

Gogue, "A Review of Steel Materials in Motion Devices", http://www.consult-g2.com/papers/paper11/paper.html, see Perm curve on Fig. 3, printed on Sep. 2018.*

Vollmer, Rolf, U.S. Pat. No. 6,628,031, Sep. 30, 2003, 2003-0011267, Jan. 16, 2003.

Duenisch et al., U.S. Pat. No. 6,885,187, Apr. 26, 2008, 2003-0094940, May 22, 2003.

Knauff et al., U.S. Pat. No. 6,768,238, Jul. 27, 2004, 2003-0173853, Sep. 18, 2003.

Mueller et al., U.S. Pat. No. 6,858,965, Feb. 22, 2005, 2004-0075359, Apr. 22, 2004.

Schunk et al, U.S. Pat. No. 6,812,612, Nov. 2, 2008, 2004-0084989, May 6, 2004.

Potoradi et al., U.S. Pat. No. 6,943,467, Sep. 13, 2005, 2004-0155539, Aug. 12, 2004.

Bott et al., U.S. Pat. No. 7,285,883, Oct. 23, 2007, 2004-0261553, Dec. 30, 2004.

Vollmer, Rolf, U.S. Pat. No. 7,141,905, Nov. 28, 2006, 2005-0231060, Oct. 20, 2005.

Huth et al., U.S. Pat. No. 7,564,158, Jul. 21, 2009, 2007-0035193, Feb. 15, 2007.

Erich Bott et al., U.S. Pat. No. 7,777,373, Aug. 17, 2010, 2008-0073985, Mar. 27, 2008.

Braun et al, U.S. Pat. No. 7,709,984, May 4, 2010, 2008-0164777, Jul. 10, 2008.

Schunk et al, U.S. Pat. No. 7,732,967, Jun. 8, 2010, 2008-0197741, Aug. 21, 2008.

Vollmer, Rolf, U.S. Pat. No. 7,705,507, Apr. 27, 2010, 2008-0197742, Aug. 21, 2008.

Bott et al, U.S. Pat. No. 7,755,315, Jul. 13, 2010, 2009-0039713, Feb. 12, 2009.

Vollmer, Rolf, U.S. Pat. No. 8,283,815, Oct. 9, 2012, 2009-0072634, Mar. 29, 2009.

Vollmer, Rolf, U.S. Pat. No. 7,915,777, Mar. 29, 2011, 2009-0206686, Aug. 20, 2009.

Bott et al., U.S. Pat. No. 8,063,517, Nov. 22, 2011, 2009-0212644, Sep. 27, 2009.

Vollmer, Rolf, U.S. Pat. No. 7,859,160, Dec. 28, 2010, 2009-0218904, Sep. 3, 2009.

Bott et al., U.S. Pat. No. 8,026,640, Sep. 27, 2011, 2009-0295236, Dec. 3, 2009.

Vollmer, Rolf et al, U.S. Pat. No. 7,977,826, Jul. 12, 2011, 2009-0295251, Dec. 3, 2009.

Budde et al., U.S. Pat. No. 8,035,371, Oct. 11, 2011, 2009-0302832, Dec. 10, 2009.

Grossmann et al., U.S. Pat. No. 8,227,951, Jul. 24, 2012, 2009-0322174, Dec. 31, 2009.

(56) References Cited

OTHER PUBLICATIONS

Vollmer, Rolf, U.S. Pat. No. 8,378,541, Feb. 19, 2013, 2010-0013332, Jan. 21, 2010.
Vollmer, Rolf, U.S. Pat. No. 8,115,360, Feb. 14, 2012, 2010-0013341, Jan. 21, 2010.
Vollmer, Rolf et al, U.S. Pat. No. 8,134,273, Mar. 13, 2012, 2010-0052466, Mar. 4, 2010.

* cited by examiner

RELUCTANCE ARMATURE

CROSS-REFERENCES TO RELATED APPLICATIONS

This application claims the priority of European Patent Application, Serial No. 14185534.6, filed Sep. 19, 2014, pursuant to 35 U.S.C. 119(a)-(d), the disclosure of which is incorporated herein by reference in its entirety as if fully set forth herein.

BACKGROUND OF THE INVENTION

The present invention relates to a reluctance armature, a dynamoelectric machine having such an armature, to the use of such a dynamoelectric machine, and to a method for manufacturing a reluctance armature.

The following discussion of related art is provided to assist the reader in understanding the advantages of the invention, and is not to be construed as an admission that this related art is prior art to this invention.

Reluctance armatures use different inductances of the laminated core in order to create a torque. In such cases the different inductances—the Ld and Lq axis—are created by punched-out areas in the laminated core. This punching out is conceivably unsuitable for smaller armature diameters and also for higher speeds, since the armatures deform through centrifugal force stress. Additional bandages to take up the centrifugal force stresses, especially with comparatively small dynamoelectric machines, would reduce the width of the air gap and would inter alia be a less efficient design of the machine.

It would therefore be desirable and advantageous to provide an improved reluctance armature for high-speed dynamoelectric machines, especially such machines with a low shaft height, to obviate prior art shortcomings and enable manufacture thereof in a simple manner while still exhibiting suitable electrical characteristics.

SUMMARY OF THE INVENTION

According to one aspect of the present invention, a reluctance armature includes a shaft received in a shaft hole in a torsion-proof manner, at least one carrier body disposed around the shaft and having radial sides as viewed in a circumferential direction, edge elements, and part segments arranged on the radial sides of the carrier body and made of anisotropic magnetic material to thereby establish an armature segment which, as viewed in an axial direction, is disposed between two of the edge elements and forms a central section.

According to another aspect of the present invention, a dynamoelectric machine, includes a reluctance armature including a shaft received in a shaft hole in a torsion-proof manner, at least one carrier body disposed around the shaft and having radial sides as viewed in a circumferential direction, edge elements, and part segments arranged on the radial sides of the carrier body and made of anisotropic magnetic material to thereby establish an armature segment which, as viewed in an axial direction, is disposed between two of the edge elements and forms a central section.

A dynamoelectric machine in accordance with the present invention is especially suitable for high speeds and small axis diameters.

According to still another aspect of the present invention, a method for manufacturing a reluctance armature includes the steps of positioning a carrier body on a shaft, providing the carrier body at least one axial end with an edge element, and placing and gluing a part segment made from anisotropic magnetic one-piece material on a radial side of the carrier body segment or on a surface of the edge element to form an armature segment.

The present invention resolves prior art shortcomings by using anisotropic soft-magnetic material so as to eliminate the need for a metal assembly of a reluctance armature. The term "anisotropic magnetic material" is to be understood as a material which in one spatial direction has a comparatively poor magnetic conductivity ($\mu_r \leq 5$) and in the other spatial directions has a comparatively good magnetic conductivity ($\mu_r \geq 20$). The rare earths neodymium-iron-boron (Nd—Fe-Bo) form the basis of this material.

Thus one-piece poles of the reluctance armature or of an axial section of the armature are possible. In order to fasten these poles, sufficiently adhesive surfaces are provided on a carrier body which, at high speeds, in order to accept the centrifugal forces, are additionally glued in the axial direction to the edge elements. The segments of the anisotropic magnetic materials are thus additionally glued to the edge elements adjoining them. Thus a maximum of three adhesive surfaces are present for each anisotropic magnetic segment, one on the carrier body and two at the axial ends of this segment with the surfaces of the edge elements corresponding thereto.

According to another advantageous feature of the present invention, the carrier body is of amagnetic configuration. As a result, the carrier body does not contribute anything to the magnetic flux and guidance. For this reason, the carrier body can be constructed from stainless steel, aluminum or plastic. To reduce the inertia of the reluctance armature a spoke construction can also be provided as carrier body which however, like the other carrier body elements, must be connected to the shaft in a torsion-proof manner.

According to another advantageous feature of the present invention, the edge elements can be configured in the form of a disk. Suitably, the disk has a central hole for passage of the shaft.

Through a prespecifiable axial segmentation of a pole of reluctance armature and the simultaneous fitting of edge elements, the adhesive surface can be increased almost in any given way. This enables even higher centrifugal force stresses to be accommodated. Thus an adaptation to almost any, especially high (>10000 rpm) speed requirement of the dynamoelectric machine is possible.

Because of different thermal properties of the anisotropic material and the carrier construction, an elastic adhesive, such as e.g. silicone, can advantageously be used.

According to another advantageous feature of the present invention, the carrier body can be connected to the shaft by a force fit and/or form fit in order to be able to transmit the torque from or to the shaft. The carrier body may also be connected to the shaft by a material-to-material bond. The shaft is likewise of amagnetic design, i.e. especially with a relative permeability of $\mu_r < 1.5$.

According to another advantageous feature of the present invention, the shaft can be made of magnetic steel. In this case, the complete carrier body is made of amagnetic material, so that no magnetically-conductive connection with the shaft exists. A heating up of the shaft by eddy current losses is thus excluded.

By using amagnetic material for the carrier body between anisotropic magnetic material and the shaft, the use of magnetic shafts rendered also possible so that costs of such a reluctance armature can be reduced.

A further advantage of the axially segmented rotor construction resides in the fact individual segments of a pole of the reluctance armature can be fastened about a pre-specifiable torsion angle to the shaft. Thus, for example, pendulum torques of the dynamoelectric machine are eliminated. For this purpose, it is necessary to construct the rotor in axial direction with at least from two segments disposed axially behind one another so that per pole a torsion angle can be provided.

According to a particular configuration in which for example the alternating current stator has 18 grooves, the segments are rotated in relation to one another by a stagger angle $\alpha=(1/n)\cdot(360°/18)$, wherein n is the number of the axial segments of the reluctance armature per pole.

By constructing the reluctance armature with structural gluing, the need for bandages in the air gap for holding together the reluctance armature can now be, advantageously, eliminated, leading to a higher utilization of the dynamoelectric machine, with utilization of the dynamoelectric machine to be understood as the torque delivered to the shaft per volume.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
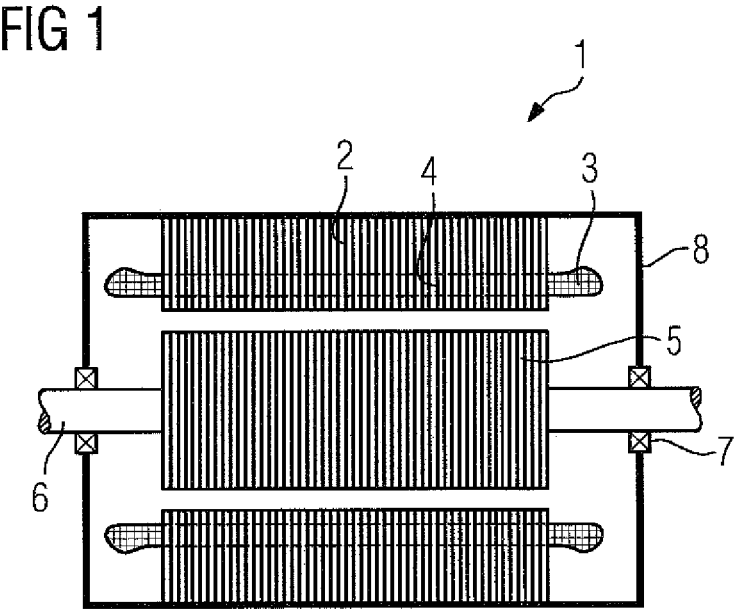
FIG. 1 is a longitudinal section of a dynamoelectric machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic longitudinal section of a dynamoelectric machine, generally designated with reference numeral 1 and including a reluctance armature 5 and a stator 2. The stator 2 has a laminated stator core and a winding system 3, which is embedded in grooves 4, not shown in any greater detail, of the laminated stator core. Through electromagnetic interaction with a rotor which is embodied as a reluctance armature 5, a torque is transmitted to a shaft 6. As an alternative, when the dynamoelectric machine 1 is embodied as a generator, the torque is converted by the shaft 6 via the reluctance armature 5 in generator mode into electrical energy.

The shaft 6 is held in bearings 7 positioned in a bearing layer shield 8.

Figure 2:
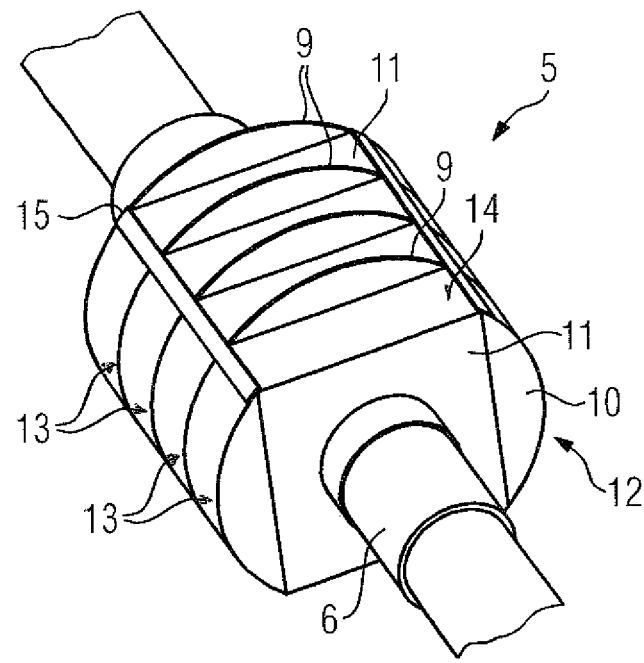
FIG. 2 is a perspective view of a structure of a reluctance armature.

FIG. 2 shows a perspective view of a structure of the reluctance armature 5. The reluctance armature 5 includes a plurality of armature segments 13 (here four by way of example) which are disposed axially behind one another on the shaft 6. Each armature segment 13 includes a carrier body 11 and disk-shaped edge elements 9 which are between the individual carrier bodies 11. Positioned on radial sides 14 of each carrier body 11 are part segments 10 which are made of anisotropic magnetic material. For ease of understanding, the radial side 14 of the carrier body 11 which points upwards has not yet been provided with a part segment 10, whereas the other sides 14 of the carrier body 11 are already provided with the individual part segments 10 made of anisotropic magnetic material.

The placement of the individual anisotropic magnetic segments 10 is realized by gluing to the radial sides 14 or surfaces of the carrier body 11 corresponding thereto and/or to the corresponding surfaces of the disk-shaped edge elements 9 corresponding thereto.

In addition the part segments 10 made of anisotropic magnetic material can also engage into corresponding recesses on an edge 15 or lug of the carrier body 11 provided for this purpose and thus receive an additional radial and/or axial fixing and/or positioning.

Figure 3:
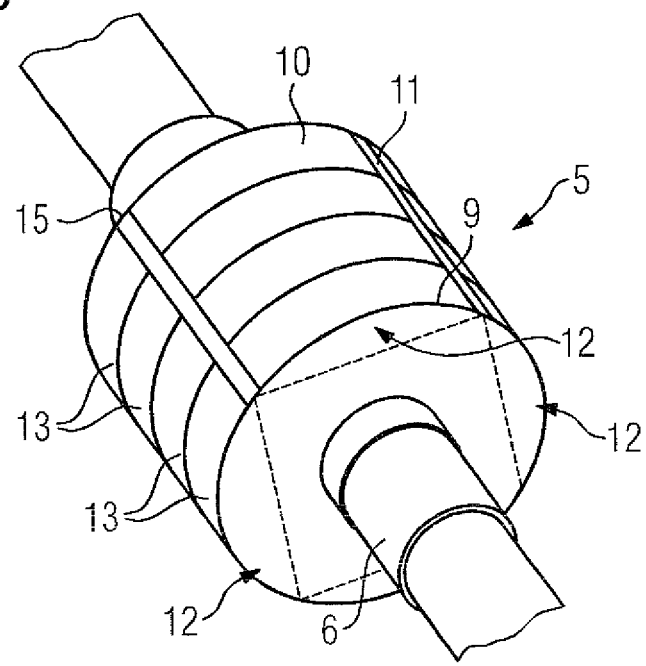
FIG. 3 is a perspective view of a fully-assembled reluctance armature.

FIG. 3 shows a fully assembled reluctance armature 5, in which an edge element 9 is provided on the end faces of the reluctance armature 5 and also between the individual axial sections, i.e. the armature segments 13. In the present exemplary embodiment no staggering of poles 12 and thus of the armature segments 13 by a pre-specifiable angle is carried out.

A staggering of the poles 12, viewed over the axial length of the armature 5, can however, be achieved during assembly by attaching each armature segment 13, comprised of carrier body 11 and, as in this case, four part segments 10 made of anisotropic magnetic materials, offset by a pre-specifiable angle in circumferential direction on the shaft 6. The armature segments 13 are hereby separated from one another by the edge elements 9, with the part segments 10 also connected by a material-to-material joint, in particular glued, with the edge elements 9.

Applications of such a reluctance armature 5 and corresponding dynamoelectric machine 1 are particularly suitable for small motors/generators (shaft height about 15 to over 300 mm) with very high rotational speeds. Thus, these types of motors can be also be used in an E-car or E-aircraft, especially when the carrier body 11 is of a very light spoke-like carrier construction, so that the entire assembly (drive or generator) is comparably lightweight and thus guarantees a high power density and high utilization of the dynamoelectric machine 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A reluctance armature, comprising:
   a shaft received in a shaft hole;
   at least one carrier body made of amagnetic material and disposed around the shaft, said carrier body having radially outer surfaces following each other in a circumferential direction;
   edge elements; and
   part segments having radially inner surfaces arranged on the radially outer surfaces of the carrier body and made of anisotropic magnetic material and following each other in the circumferential direction to thereby establish an armature segment which, as viewed in an axial direction, is disposed between two of said edge elements and forms a section,
   wherein the part segments extend over a circumference of the carrier body and engage into corresponding recesses on edges or lugs of the of the carrier body for additional radial and/or axial fixing and/or positioning, and each part segment in a cross section perpendicular to an axis of the shaft has a radially outer contour formed by a circular arc extending in a circumferential direction and having opposite circumferential ends and a radially inner contour formed by a straight line connecting the edges or lugs with each other.

2. The reluctance armature of claim 1, wherein the edge elements are disk-shaped.

3. The reluctance armature of claim 1, wherein the radially outer surfaces of the carrier body are flat.

4. The reluctance armature of claim 1, wherein the carrier body is made of stainless steel, aluminum or plastic and/or has a spoke carrier structure.

5. The reluctance armature of claim 1, wherein the carrier body is connected to the shaft by a force fit and/or form fit.

6. The reluctance armature of claim 1, wherein the anisotropic magnetic part segments are positioned and fixed by gluing to the carrier body and/or to the edge elements by an elastic adhesive.

7. The reluctance armature of claim 6, wherein the elastic adhesive is silicone.

8. A dynamoelectric machine comprising a reluctance armature including a shaft received in a shaft hole, at least one carrier body made of amagnetic material and disposed around the shaft, said carrier body having radially outer surfaces following each other in a circumferential direction, edge elements, and part segments having radially inner surfaces arranged on the radially outer surfaces of the carrier body, made of anisotropic magnetic material and following each other in the circumferential direction to thereby establish an armature segment which, as viewed in an axial direction, is disposed between two of said edge elements and forms a section, wherein the part segments extend over a circumference of the carrier body and engage into corresponding recesses on edges or lugs of the carrier body for additional radial and/or axial fixing and/or positioning and each part segment in a cross section perpendicular to an axis of the shaft has a radially outer contour formed by a circular arc extending in a circumferential direction and having opposite circumferential ends and a radially inner contour formed by a straight line connecting the edges or lugs with each other.

9. The dynamoelectric machine of claim 8, wherein the edge elements are disk-shaped.

10. The dynamoelectric machine of claim 8, wherein the radially outer surfaces of the carrier body are flat.

11. The dynamoelectric machine of claim 8, wherein the carrier body is made of stainless steel, aluminum or plastic and/or has a spoke carrier structure.

12. The dynamoelectric machine of claim 8, wherein the carrier body is connected to the shaft by a force fit and/or form fit.

13. The dynamoelectric machine of claim 8, wherein the anisotropic magnetic part segments are positioned and fixed by gluing to the carrier body and/or to the edge elements by an elastic adhesive.

14. The dynamoelectric machine of claim 13, wherein the elastic adhesive is silicone.

15. The dynamoelectric machine of claim 8 for use in an object selected from the group consisting of a machine tool, a production machine, a helicopter, an airplane, a traction drive of a locomotive, a traction drive of a streetcar, and an electric car.

16. A method for manufacturing a reluctance armature, said reluctance armature comprising a shaft received in a shaft hole, at least one carrier body disposed around the shaft and having radial skies as viewed in a circumferential direction, edge elements, and part segments arranged on the radial skies of the carrier body and made of anisotropic magnetic material to thereby establish an armature segment which, as viewed in an axial direction, is disposed between two of said edge elements and forms section, said method comprising:
   positioning a carrier body having radially outer surfaces following each other in a circumferential direction made of amagnetic material on a shaft;
   providing an edge element at an axial end of the carrier body;
   placing and gluing part segments having radially inner surfaces and made from anisotropic magnetic one-piece material on the radially outer surfaces of the carrier body to form an armature segment; and
   extending the part segments over a circumference of the carrier body to engage into corresponding recesses on edges or lugs of the carrier body for additional radial and/or axial fixing and/or positioning and forming each part segment such that, in a cross section perpendicular to an axis of the shaft, each part segment has a radially outer contour formed by a circular arc extending in a circumferential direction and a radially inner contour formed by a straight line connecting the edges or lugs with each other.

* * * * *